United States Patent
Kuroki

(10) Patent No.: US 9,138,953 B2
(45) Date of Patent: Sep. 22, 2015

(54) PNEUMATIC TIRE AND METHOD OF MANUFACTURING SAME

(75) Inventor: Takeshi Kuroki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 999 days.

(21) Appl. No.: 13/266,874

(22) PCT Filed: Mar. 17, 2010

(86) PCT No.: PCT/JP2010/054501
§ 371 (c)(1),
(2), (4) Date: Oct. 28, 2011

(87) PCT Pub. No.: WO2010/134379
PCT Pub. Date: Nov. 25, 2010

(65) Prior Publication Data
US 2012/0048434 A1 Mar. 1, 2012

(30) Foreign Application Priority Data
May 18, 2009 (JP) .................... 2009-120116

(51) Int. Cl.
*B60C 19/08* (2006.01)
*B29D 30/60* (2006.01)
(Continued)

(52) U.S. Cl.
CPC ............ *B29D 30/60* (2013.01); *B60C 11/0058* (2013.04); *B60C 11/0075* (2013.04); *B60C 19/082* (2013.04); *B29D 2030/526* (2013.01); *B60C 2011/0091* (2013.04)

(58) Field of Classification Search
CPC .... B60C 19/08; B60C 1/082; B60C 11/0008; B60C 2011/0016; B60C 11/0041; B60C 11/005; B60C 2011/0091; B60C 1/00; B60C 11/0058; B60C 11/0075; B29D 2030/526; B29D 30/3028; B29D 30/3021; B29D 30/1621; B29D 30/1628; B29D 30/60

USPC ................ 152/152.1, 209.5, DIG. 2; 156/117
See application file for complete search history.

(56) References Cited

U.S. PATENT DOCUMENTS 6,367,525 B1 * 4/2002 Hiruma et al. ............. 152/152.1
6,415,833 B1 * 7/2002 Komatsu .................... 152/152.1
(Continued)

FOREIGN PATENT DOCUMENTS

DE  10 2007 004 327 A1   7/2008
FR     2 775 220 A1       8/1999
(Continued)

OTHER PUBLICATIONS

International Search Report, dated Jun. 8, 2010 in PCT/JP2010/054501.
(Continued)

*Primary Examiner* — Eric Hug
(74) *Attorney, Agent, or Firm* — Birch, Stewart, Kolasch & Birch, LLP

(57) ABSTRACT

Tread rubber is provided with a base rubber section formed by helically winding a first electrically non-conductive rubber strip, a cap rubber section formed by helically winding a second electrically non-conductive rubber strip, and a conduction section penetrating through the base rubber section and the cap rubber section and extending in the radial direction. The conduction section is composed of: a first electrically conductive winding section consisting of a first electrically conductive rubber strip which is wound within the base rubber section so as to be superposed on the first electrically non-conductive rubber strip; and a second electrically conductive winding section consisting of a second electrically conductive rubber strip which is wound within the cap rubber section so as to be superposed on the second electrically non-conductive rubber strip.

4 Claims, 10 Drawing Sheets

(51) Int. Cl.
 *B60C 11/00* (2006.01)
 *B29D 30/52* (2006.01)

(56) References Cited

U.S. PATENT DOCUMENTS

| | | | |
|---|---|---|---|
| 2006/0042733 A1* | 3/2006 | Matsui | 152/152.1 |
| 2006/0096697 A1* | 5/2006 | Miki | 156/130 |
| 2006/0174986 A1* | 8/2006 | Ogawa | 152/152.1 |
| 2008/0283165 A1* | 11/2008 | Mafune et al. | 152/152.1 |

FOREIGN PATENT DOCUMENTS

| | | | |
|---|---|---|---|
| JP | 9-71112 A | | 3/1997 |
| JP | 2003-326614 A | | 11/2003 |
| JP | 2004-338621 A | | 12/2004 |
| JP | 2005-35337 A | | 2/2005 |
| JP | 2005-41055 | * | 2/2005 |
| JP | 2005-41055 A | | 2/2005 |
| JP | 2006-137067 A | | 6/2006 |
| JP | 2008-285070 A | | 11/2008 |
| WO | WO 2008/101555 | * | 8/2008 |

OTHER PUBLICATIONS

European Search Report dated Jul. 4, 2013 for Application No. 10777614.8.

* cited by examiner

PNEUMATIC TIRE AND METHOD OF MANUFACTURING SAME

TECHNICAL FIELD

The present invention relates to a pneumatic tire and a method of manufacturing the pneumatic tire enabling to discharge static electricity in a car through a road surface.

BACKGROUND OF THE INVENTION

Recently, to reduce a rolling resistance of a tire and to improve a wet grip performance, it is proposed to compound silica into a tread rubber as a rubber reinforcement agent in place of carbon black. However, the silica is inferior in electrical conductivity and increases electric resistance of the tread rubber. Therefore, in a tire comprising a tread rubber containing silica, the static electricity is accumulated in the car, and it may possibly cause an electromagnetic wave obstacle such as radio noise.

The following Patent Document 1 proposes a tread rubber (a) shown in FIG. 11 (A), for example. This tread rubber (a) comprises a base rubber section (b) made of an electrically conductive rubber containing carbon, a cap rubber section (c) made of an electrically non-conductive rubber containing silica and superposed on the above-mentioned base rubber section (b) outwardly in the radial direction, and a conducting section (d) made of an electrically conductive rubber which extrudes from the base rubber section (b) outwardly in the radial direction, penetrates the cap rubber layer (c), and is exposed on an tread ground contact area. Such a tread rubber (a) can be formed in extrusion molding.

To suppress uneven wear occurring between the above-mentioned conducting section (d) and the cap rubber section (c), it is preferable to form a width W of the conducting section (d) as small as possible. When the width W is set to be small in the extrusion molding, the conducting section (d) may terminate inside, so that it may not possibly conduct. In that case, the termination occurred inside the conducting section (d) cannot be easily judged, so that it leads to a problem of need to perform a one hundred percent inspection of the tire conducting.

The following Patent Document 2 proposes, as shown in FIG. 11 (B), to apply so-called strip winding method that the rubber strip is helically wound in place of the above-mentioned extrusion molding so as to form the above-mentioned base rubber section (b), cap rubber section (c), and conducting section (d). This strip winding method has an advantage that the termination (bad conducting) of the conducting section (d) can be easily checked as a tension crack of the winding rubber strip.

However, the pneumatic tire preferably comprises the above-mentioned base rubber section (b) also made of the electrically non-conductive rubber containing silica in order to reduce more the rolling resistance. In that case, it is necessary to provide in the base rubber section (b) with the conduction section so as to penetrate into the base rubber section (b) and extending in the radial direction, and to connect by butting together the radial outer end of the conduction section and the radial inner end of the conduction section positioned in the above-mentioned cap rubber section (c). The conduction section is formed of a thin rubber strip having a thickness of about 2 mm. Therefore, it is difficult to butt the conduction sections with each other, and there is a problem of reducing notably the productive efficiency.

Incidentally, other than butting together the conduction sections, as shown in FIG. 11 (C) for example, it is proposed to form a single conducting section (d) penetrating both of the base rubber section (b) and the cap rubber section (c) by spirally winding a fine rubber strip (p) being thin in a strip width (wp) outwardly in the radial direction in such a way as to stack it up. In this case, the above-mentioned conducting section (d) divides the base rubber section (b) and the cap rubber section (c) into a right half and a left half. Therefore, it becomes necessary that the divided base rubber sectional parts b1 and b2, and the cap rubber sectional parts c1 and c2 are separately formed with the rubber strip; and the production efficiency decreases. Furthermore, between the conducting section (d) and the base rubber sectional parts b1 and b2, and between the conducting section (d) and the cap rubber sectional parts c1 and c2, an air pocket is liable to occur. It deteriorates the tire uniformity and causes a problem of elevation of the incidence of product defects. In view of loosing the winding shape of the rubber strip (p), namely the width (wp), a width W of the conducting section (d) cannot be too small. Therefore, it becomes difficult to sufficiently reduce the uneven wear caused by the conducting section (d).

The following Patent Document 3 discloses that the both ends of the rubber strip are butted with each other for conduction.

Patent Document 1: Japanese Laid-open Patent Publication No. H9-71112;
Patent Document 2: Japanese Laid-open Patent Publication No. 2006-137067:
Patent Document 3: Japanese Laid-open Patent Publication No. 2008-285070.

SUMMARY OF THE INVENTION

Problem to be Solved by the Invention

Thereupon, there are objects of the present invention to provide a pneumatic tire and a method of manufacturing the pneumatic tire enabling to easily and reliably connect and conduct the conduction section penetrating the above-mentioned base rubber section and the conduction section penetrating the cap rubber section in a tire having a rolling resistance formed by use of the electrically non-conductive rubber strip containing silica, enabling to reduce the product defects and the uniformity depression caused the air pocket, and enabling to improve the production efficiency.

Means of Solving the Problems

In accordance with claim 1 of the present invention to solve the above problems, a pneumatic tire comprises a toroidal carcass extending from a tread section to a bead core in a bead section through a sidewall section; a tread reinforcing-cord layer disposed outside the carcass in the radial direction of the tire and inside the above-mentioned tread section and electrically-conducted to a rim at a state of mounting the tire on the rim; and a tread rubber of which a radially inner periphery forms a contact area contacting the above-mentioned tread reinforcing-cord layer and of which a radially outer periphery forms a tread ground contact area contacting a road surface. The above-mentioned tread rubber comprises a base rubber section which is formed of a strip winding body made of a first electrically non-conductive rubber strip containing silica and helically wound from one tread edge side to another tread edge side and which comprises the above-mentioned contact area; a cap rubber section which is formed of a strip winding body made of a second electrically non-conductive rubber strip containing silica and helically wound from the other tread edge side to the one tread edge side and which comprises the above-mentioned tread ground contact area and is superposed on the above-mentioned base rubber section outwardly in the radial direction; and a conduction section which penetrates through the above-mentioned base rubber section and the above-mentioned cap rubber section and extends inward and outward in the radial direction and of which radial inner end is exposed at the above-mentioned contact area and of which radial outer end is exposed at the above-mentioned tread ground contact area. The above-mentioned conduction section comprises a first electrically conductive winding section standing between winding sections of the above-mentioned first electrically non-conductive rubber strip adjacent in the tire axial direction inside the above-mentioned base rubber section and formed of a first electrically conductive rubber strip wound helically with the above-mentioned first electrically non-conductive rubber strip; and a second electrically conductive winding section standing between winding sections of the above-mentioned second electrically non-conductive rubber strip adjacent in the tire axial direction inside the above-mentioned cap rubber section and formed of a second electrically conductive rubber strip wound helically with the above-mentioned second electrically non-conductive rubber strip. An exposed surface section comprising a radial upper end of the above-mentioned first electrically conductive winding section exposed at the radially outer periphery of the above-mentioned base rubber section and an exposed surface section comprising a radial lower end of the above-mentioned second electrically conductive winding section exposed at the radially inner periphery of the above-mentioned cap rubber section are tilted in different directions relative to the circumferential direction of the tire, and these exposed surface sections intersect each other, and as the result, the above-mentioned first and second electrically conductive winding sections are conducted each other at the above-mentioned position of the intersection. In the above-mentioned second electrically conductive winding section, the above-mentioned second electrically conductive rubber strip is helically wound less than once, and a circumferential distance D in the tread ground contact area between the starting part and the terminate part of this winding is not more than 100% of a tread ground contacting length L.

In accordance with claim 2 of the present invention, the pneumatic tire as set forth in claim 1 or 2 is characterized in that in the above-mentioned first electrically conductive winding section, the above-mentioned first electrically conductive rubber strip is helically wound more than once.

In accordance with claim 3 of the present invention, the pneumatic tire as set forth in claim 1 or 2 is characterized in that a ratio Tc/Tb on the tire equator in that the tread rubber between a radial thickness Tc of the cap rubber section and a radial thickness Tb of the above-mentioned base rubber section is more than 1.0.

In accordance with claim 4 of the present invention, the pneumatic tire as set forth in any one of claims 1 to 3 is characterized in that a loss tangent tan $\delta 2$ of the above-mentioned second electrically non-conductive rubber strip is larger than a loss tangent tan $\delta 1$ of the above-mentioned first electrically non-conductive rubber strip.

In accordance with claim 5 of the present invention, a method of manufacturing a pneumatic tire comprises a tread reinforcing-cord layer electrically-conductive to a rim in a state of the tire mounted on the rim, a tread rubber of which the radially inner periphery forms a contact area contacting the above-mentioned tread reinforcing-cord layer and of which the radially outer periphery forms a tread ground contact area contacting a road surface. The method comprises a tread rubber forming process and a vulcanizing process to vulcanize a green tire provided with the above-mentioned tread rubber in the tread section. The above-mentioned process of forming the tread rubber comprises a base rubber section forming step to form the base rubber section outward the above-mentioned tread reinforcing-cord layer in the radial direction of the tire by helically winding an unvulcanized first electrically non-conductive rubber strip containing silica from the one tread edge side to the other tread edge side, and a cap rubber section forming step to form the cap rubber section outward the above-mentioned base rubber portion in the radial direction by helically winding an unvulcanized second electrically non-conductive rubber strip containing silica from the other tread edge side to the one tread edge side. The above-mentioned step of forming the base rubber section comprises a step of forming a first electrically conductive winding section to form the first electrically conductive winding section comprising the unvulcanized first electrically conductive rubber strip wound helically with the unvulcanized first electrically non-conductive rubber strip between winding sections of the above-mentioned unvulcanized first electrically non-conductive rubber strips adjacently in the axial direction of the tire by interrupting the unvulcanized first electrically conductive rubber strip being the substantially same in width as the above-mentioned unvulcanized first electrically non-conductive rubber strip into the above-mentioned unvulcanized first electrically non-conductive rubber strip. The above-mentioned cap rubber section forming step comprises a step of forming a second electrically conductive winding section to form the second electrically conductive winding section comprising the unvulcanized second electrically conductive rubber strip wound helically with the unvulcanized second electrically non-conductive rubber strip between winding sections of the above-mentioned unvulcanized second electrically non-conductive rubber strips adjacently in the axial direction of the tire by interrupting into the above-mentioned unvulcanized second electrically non-conductive rubber strip the unvulcanized second electrically conductive rubber strip being the substantially same in width as the above-mentioned unvulcanized second electrically non-conductive rubber strip. An exposed surface section comprising a radial upper end of the above-mentioned first electrically conductive winding section exposed at the radially outer periphery of the above-mentioned base rubber section and an exposed surface section comprising a radial lower end of the above-mentioned second electrically conductive winding section exposed at the radially inner periphery of the above-mentioned cap rubber section are tilted in different directions relative to the circumferential direction of the tire, and these exposed surface sections intersect each other, and as a result, the above-mentioned first and second electrically conductive winding sections are conducted each other at the above-mentioned position of the intersection. In the above-mentioned second electrically conductive winding section, the above-mentioned second electrically conductive rubber strip is helically wound less than once.

The above-mentioned "tread ground contact area" is a surface of the tread section when the tire is mounted on a regular rim inflated to a regular pressure and loaded with a regular load and contacts a plain surface at a camber angle of 0 degrees. In the above-mentioned tread ground contact area, the outmost point in the axial direction of the tire is determined as a tread edge. And the "tread ground contact length L" is a length in the circumferential direction of the tire at a state of a shape Q of the ground contact area when the tire contacts the ground.

The above-mentioned "regular rim" is a rim determined for each tire by a standard including one on which the tire is based. For example, it is a standard rim in the case of JATMA, a "Design Rim" in the case of TRA, and a "Measuring Rim" in the case of ETRTO. The above-mentioned "regular internal pressure" means an air pressure determined for each tire by the standard. For example, it is the maximum air pressure in JATMA, the maximum value described in a table "TIRE LOAD LIMITS AT VARIOUS COLD INFLATION PRESSURES" in the case of TRA, and the "INFLATION PRESSURE" in the case of ETRTO. When the tire is for a passenger vehicle, the regular internal pressure is 180 KPa. The above-mentioned "regular load" is a load determined for each tire by the standard. For example, it is the maximum load ability in the case of JATMA, the maximum value described in a Table "TIRE LOAD LIMITS AT VARIOUS COLD INFLATION PRESSURES" in the case of TRA, and the "LOAD CAPACITY" in the case of ETRTO. When the tire is for a passenger vehicle, the regular load is a load equivalent to 88% of the above-mentioned load.

A loss tangent of the rubber strip is a loss tangent of a vulcanized rubber, which is measured under the following conditions with "viscoelastic spectrometer" manufactured by Iwamoto-seisakusyo Co., Ltd. in accordance with the JIS-K6394 (Japanese Industrial Standard):
Initial strain: 10%
Amplitude: ±1%
Frequency: 10 Hz
Deformation mode: Strain
Measured temperature: 70 degrees C.

Effects of the Invention

In the present invention, both of the first electrically non-conductive rubber strip forming the base rubber section and the first electrically conductive rubber strip forming the first electrically conductive winding section are helically wound from the one tread edge side toward the other tread edge side. However, both of the second electrically non-conductive rubber strip forming the cap rubber section and the second electrically conductive rubber strip forming second electrically conductive winding section are helically wound from the other tread edge side toward the one tread edge side.

In this way, the exposed surface section where the radial direction upper end of the above-mentioned first electrically conductive winding section is exposed at the radially outer periphery of the base rubber section and the exposed surface section where the radial direction lower end of the above-mentioned second electrically conductive winding section is exposed at the radially inner periphery of the above-mentioned cap rubber section are tilted with each other in different directions relative to the circumferential direction of the tire. Owing to this difference of the tilt, the above-mentioned exposed surface sections can intersect each other, and the above-mentioned first and second electrically conductive winding section can be conducted with each other at the position of this intersection.

Consequently, the exposed surface sections are not overlapped each other over the entire circumference in the circumferential direction of the tire; but the tilting directions of the exposed surfaces section daringly differ. When the exposed surface section is shifted to some extent in the axial direction of the tire, the exposed surface sections can intersect with each other, and the above-mentioned first and second electrically conductive winding sections can be reliably conducted (contacted) each other at the point of the intersection.

The first and second electrically conductive winding sections can be formed by interrupting and winding the first and second electrically conductive rubber strips when winding the first and second electrically non-conductive rubber strips, respectively; and the production efficiency can be improved. In both sides of the conduction section, it is not needed to divide the base rubber section and the cap rubber section; therefore, the above-mentioned high production efficiency ban be kept, and a large air pocket does not occur in the both sides of the conduction section. Also the product defect caused from it and the depression of the uniformity can be reduced.

EXPLANATION OF THE REFERENCE

Figure 1:
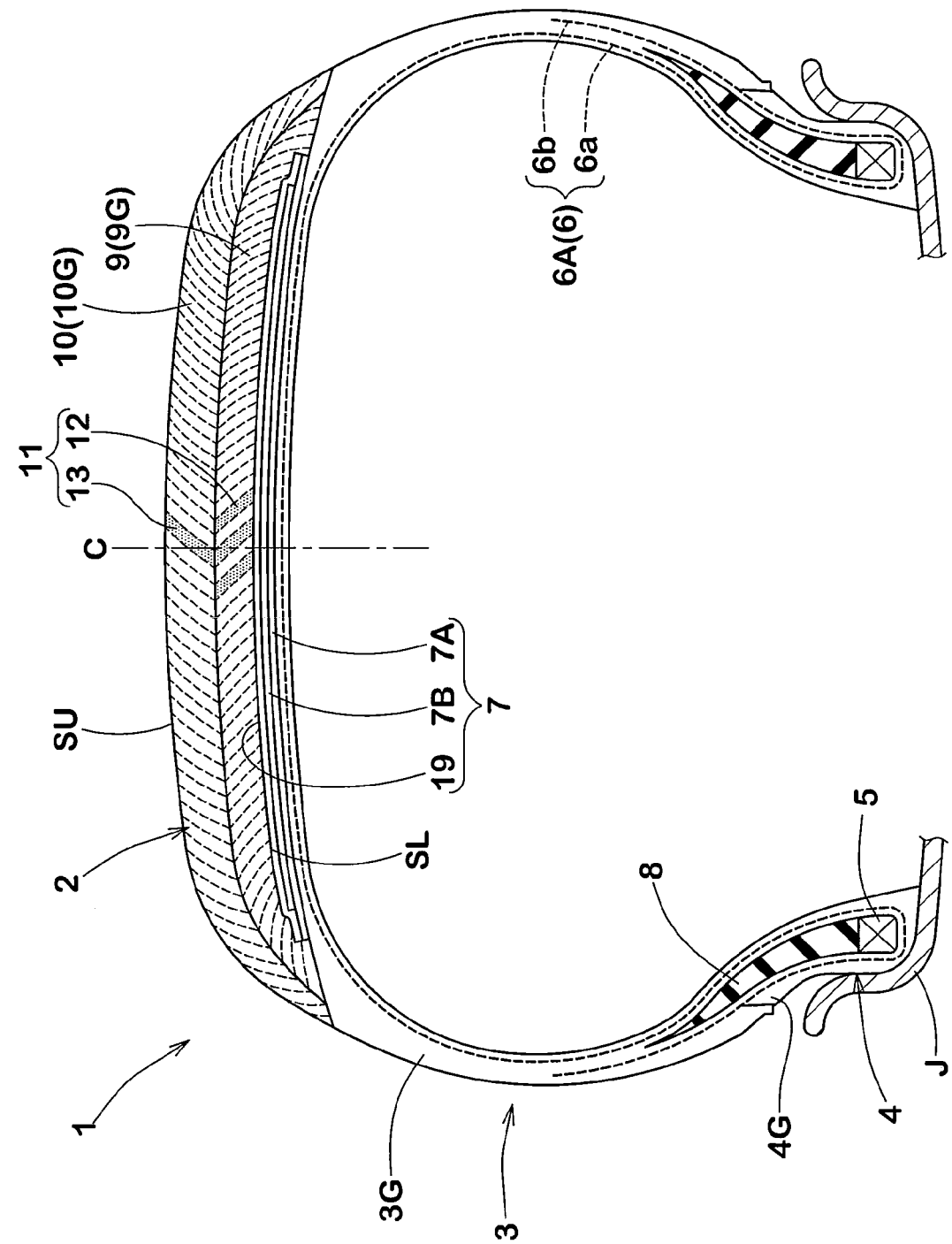
FIG. 1 A cross-sectional view of a pneumatic tire of the present invention showing an embodiment.

2 Tread section
2G Tread rubber
3 Sidewall section
4 Bead section
5 Bead core
6 Carcass
7 Tread reinforcing-cord layer
9 Base rubber section
9G First electrically non-conductive rubber strip
10 Cap rubber section
10G Second electrically non-conductive rubber strip
11 Conduction section
12 First electrically conductive winding section
12G First electrically conductive rubber strip
12U upper end
12SU Exposed surface section
13 Second electrically conductive winding section
13G Second electrically conductive rubber strip
13L Lower end
13SL Exposed surface section
E1 Starting part
E2 Terminate part
J Rim
R winding section
SL Contact area
SU Tread ground contact area ST Tread rubber forming provide
ST1 Step of forming Base rubber section
ST2 Step of forming Cap rubber section
ST3 Step of forming First electrically conductive winding section
ST4 Step of forming Second electrically conductive winding section

BEST MODE FOR CARRYING OUT THE INVENTION

Hereinafter, embodiments of the present invention will be particularly described. FIG. 1 is a cross-sectional view of a pneumatic tire 1 obtained by the method of manufacturing according to the present invention.

In FIG. 1, the pneumatic tire 1 of the present embodiment comprises a toroidal carcass 6 extending from a tread section 2 to a bead core 5 of a bead section 4 through a sidewall section 3, and a tread reinforcing-cord layer 7 disposed outside the carcass 6 in the radial direction of the tire and inside the tread section 2.

The above-mentioned carcass 6 is formed of not less than one carcass ply 6A, a single carcass ply 6A in this embodiment, arranged a carcass cord with respect to the circumferential direction of the tire at an angle of 75 to 90 degrees, for example. The carcass ply 6A comprises, for example, a ply main section 6a connecting the bead cores 5 and 5, and a pair of ply turned up sections 6b continuing into the both ends thereof and turned up around each of the bead cores 5 from the axial inside to the axial outside of the tire. Moreover, between the ply main section 6a and the ply turned up section 6b, there is a bead apex rubber 8 extending from the bead core 5 outwardly in the radial direction to reinforce the bead.

The above-mentioned tread reinforcing-cord layer 7 is formed by layering not less than two belt plies, two belt plies 7A and 7B in the present example, made of metal cords arranged at an angle of 15 to 40 degrees with respect to the tire circumferential direction, for example. In this tread reinforcing-cord layer 7, the respective belt cords are intersect with each other between the plies, so that the belt rigidity can be improved, and a hoop effect of a substantially overall width of the tread section 2 can be solidly reinforced. This tread reinforcing-cord layer 7 can be provided in the outside thereof with a band ply 19 formed of helically winding a band cord with respect to the circumferential direction of the tire, if necessarily.

These carcass ply 6A, belt plies 7A and 7B, band ply 19 comprise topping rubber covering the above-mentioned cord, respectively. In the present example, each topping rubber contains a high proportion of carbon black as a rubber reinforcement agent just like a conventional general tire. For this reason, a value of the volume intrinsic electric resistance of the topping rubbers is less than $1.0 \times 10^8$ ($\Omega \cdot cm$) preferably not more than $1.0 \times 107$ ($\Omega \cdot cm$) and the topping rubber has an electrical conductivity.

Incidentally in the present description, a volume of intrinsic electric resistance of the rubber is measured by use of an electric resistance measuring instrument (ADVANTESTER 8340A, in this example) under the following condition:
Rubber sample: 15 cm square and 2 mm of thickness,
Applied voltage: 500V,
Air temperature: 25 degrees C.,
Humidity: 50%.

The sidewall section 3 comprises in the outside of the above-mentioned carcass 6 with a sidewall rubber 3G forming a sidewall outer surface. This sidewall rubber 3G has a radial outer end, which is sandwiched and terminates between the above-mentioned carcass 6 and the tread reinforcing-cord layer 7. And, the bead section 4 comprises in the outside of the carcass 6 with a clinch rubber 4G contacting a rim J. This clinch rubber 4G has a radial upper end, which is connected with the radial direction lower end of the above-mentioned sidewall rubber 3G. In the present example, each of the rubber 3G and the clinch rubber 4G contains a high proportion of carbon black as the rubber reinforcement agent just like the conventional general tire. For this reason, a value of the volume intrinsic electric resistance of the topping rubbers is less than $1.0 \times 10^8$ ($\Omega \cdot cm$), preferably not more than $1.0 \times 10^7$ ($\Omega \cdot cm$), and the sidewall rubber 3G; and the clinch rubber 4G has the electrical conductivity.

Therefore, in this example, at a state of the tire mounted on the rim, the above-mentioned tread reinforcing-cord layer 7 can electrically conduct the rim J through the topping rubber of the above-mentioned band ply 19, the topping rubber of the belt plies 7A and 7B, the topping rubber of the carcass ply 6A, the sidewall rubber 3G, and clinch rubber 4G. Incidentally, when the electrically-conductivity can be kept a part of the topping rubber and/or the sidewall rubber 3G can be formed by the non-conductive rubber having the volume of intrinsic electric resistance of not less than $1.0 \times 10^8$ ($\Omega \cdot cm$)

Outside the above-mentioned tread reinforcing-cord layer 7 in the radial direction, there is a tread rubber 2G. A radially inner periphery of the tread rubber 2G forms a contact area SL of contacting the tread reinforcing-cord layer 7. A radially outer periphery of the tread rubber 2G forms a tread ground contact area SU contacting a road surface.

The tread rubber 2G comprises a base rubber section 9, a cap rubber section 10, and a conduction section 11. The base rubber section 9 comprises the above-mentioned contact area SL and is positioned inward in the radial direction. The cap rubber section 10 comprises the above-mentioned tread ground contact area SU and is superposed on the above-mentioned base rubber section 9 radially-outwardly. The conduction section 11 extends in the radial direction inward and outward in penetrating the above-mentioned base rubber section 9 and the cap rubber section 10, of which radial inner end is exposed in the above-mentioned contact are SL, and of which radial outer end is exposed in the above-mentioned tread ground contact area SU.

Figure 2:
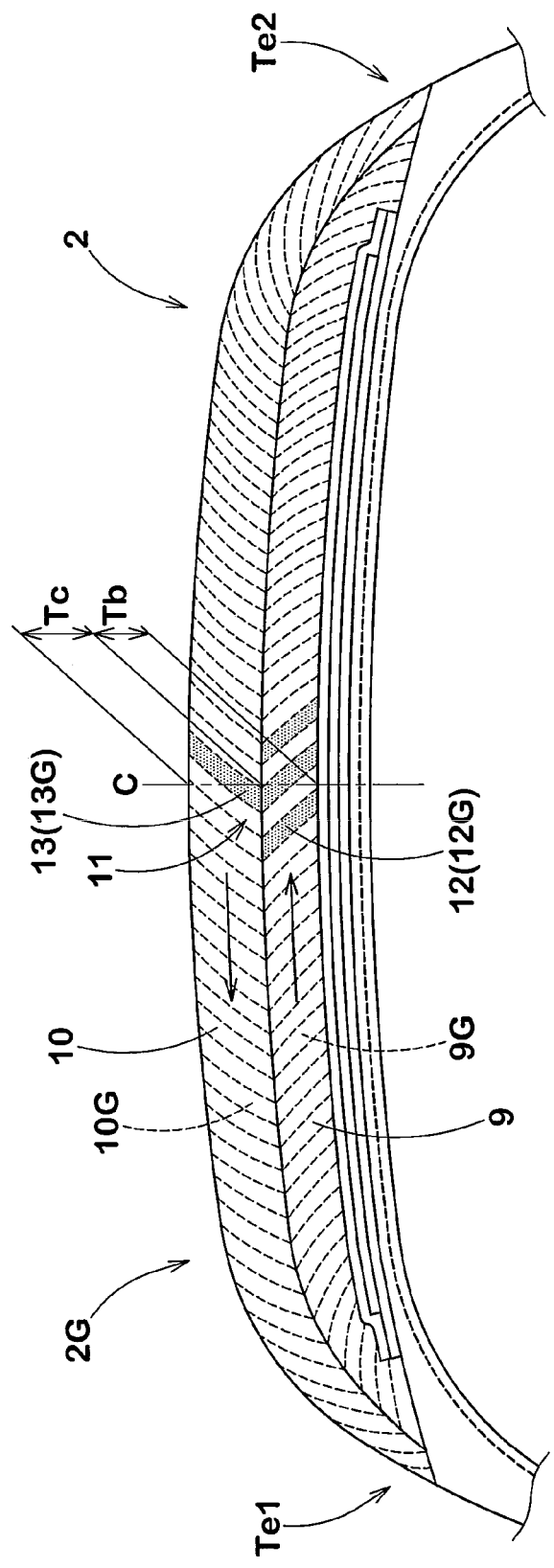
FIG. 2 An enlarged cross-sectional view of a tread section.

The above-mentioned base rubber section 9 is formed, as shown in FIG. 2 in close-up, of a strip winding body made of a first electrically non-conductive rubber strip 9G containing silica and helically and continuously wound from one tread edge Te1 side to another tread edge Te2 side. The cap rubber section is formed of a strip winding body made of a second electrically non-conductive rubber strip 10G containing silica and helically wound from the other tread edge Te2 side to the one tread edge Te1 side. Both of the side edges of the first electrically non-conductive rubber strip 9 form a radially inner periphery and a radially outer periphery of the base rubber section 9. And, both of the side edges of the second electrically non-conductive rubber strip 10G form a radially inner periphery and a radially outer periphery of the cap rubber section 10.

For each of the above-mentioned first and second electrically non-conductive rubber strips 9G and 10G, the rubber containing high proportion of silica is used. Such a rubber containing silica can improves, in the cap rubber section 10, the wet grip property while reducing the rolling resistance. Principally, the rolling resistance can be reduced in the base rubber section 9. Therefore, the wet grip property and the low rolling resistance property can be improved in a high level; and a superior vehicle driving performance can be demonstrated comprehensively. Incidentally, in the present example, a loss tangent tan δ2 of the above-mentioned second electrically non-conductive rubber strip 10G is larger than a loss tangent tan δ1 of the above-mentioned first electrically non-conductive rubber strip 9G. This increases more the wet grip property. The ratio tan δ2/tan δ1 of the above-mentioned loss tangents is preferably not less than 1.5, more preferably not less than 2.0, furthermore preferably not less than 2.5. And its upper limit is preferably not more than 5.0 in view of the negative effect on the rolling resistance when the ratio is too large.

The rubber polymer forming the above-mentioned first and second electrically non-conductive rubber strips 9G and 10G includes, for example, natural rubber (NR), butadiene rubber (BR), styrene butadiene rubber (SBR), polyisoprene rubber (IR), nitrile rubber (NBR), chloroprene rubber (CR) and the like. Single specie or not less than two species of them can be blended. The containing silica in the first and second electrically non-conductive rubber strips 9G and 10G is not especially limited, but to improve the reinforce effect for rubber and rubber processability, the silica having a surface area determined from nitrogen adsorption (BET) ranging from 150 to 250 m$^2$/gram and a dibutyl phthalate (DBP) oil absorption of from not less than 180 ml/100 gram, and having colloidal characteristic is preferably used. Subsequently, as a silane-coupling agent, bis(triethoxysilylpropyl)tetrasulfide and alpha-mercaptpropyltrimethoxysilane are preferably used.

To improve the low rolling-resistance performance and the wet grip performance in higher level, a combination amount of the silica is preferably not less than 30 parts by mass, more preferably not less than 40 parts by mass; and, the upper limit is preferably not more than 100 parts by mass, more preferably not more than 80 parts by mass, furthermore preferably not more than 60 parts by mass with respect to the rubber polymer 100 parts by mass. In the first and second electrically non-conductive rubber strips 9G and 10G, carbon black may be supplementarily compounded. This is useful in adjusting other rubber property, such as rubber elasticity and rubber hardness, for example. In this case, a combination amount of carbon black is preferably less than the combination amount of silica, particularly not more than 15 parts by mass, more preferably not more than 10 parts by mass with respect to rubber polymer 100 parts by mass. The combination amount of the carbon black of over 15 parts by mass is not preferable because the rolling resistance deteriorates considerably, and the rubber is liable to become excessively hard.

Figure 4:
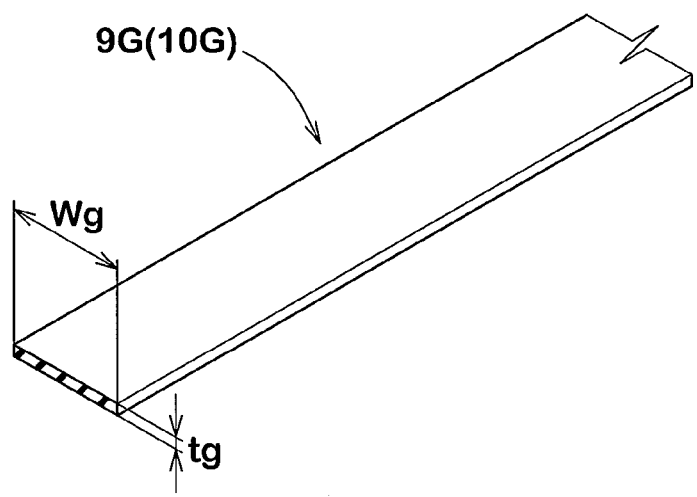
FIG. 4 A diagrammatic perspective view of the rubber strip showing an example.

Each of the above-mentioned first and second electrically non-conductive rubber strips 9G and 10G is a ribbon-like rectangle in cross-section shape having an enough larger width wg than a thickness (tg) as shown in FIG. 4. For each of the rubber strips 9G and 10G, depending on the tire size and its species, preferably used is a rubber strip having about 5 to 50 mm in width wg and about 0.5 to 3 mm in thickness (tg). When the width wg is less than 5 mm and when the thickness (tg) is less than 0.5 mm, the rubber strip may be easily fractured at a time of winding, and the number of winding for forming the tread rubber 2G enormously increases; therefore, the production efficiency may provably decrease. However, when the above-mentioned width wg of 50 mm or when the thickness (tg) is over 3 mm, it becomes difficult to shape a precise cross sectional shape by helically winding.

Figure 3:
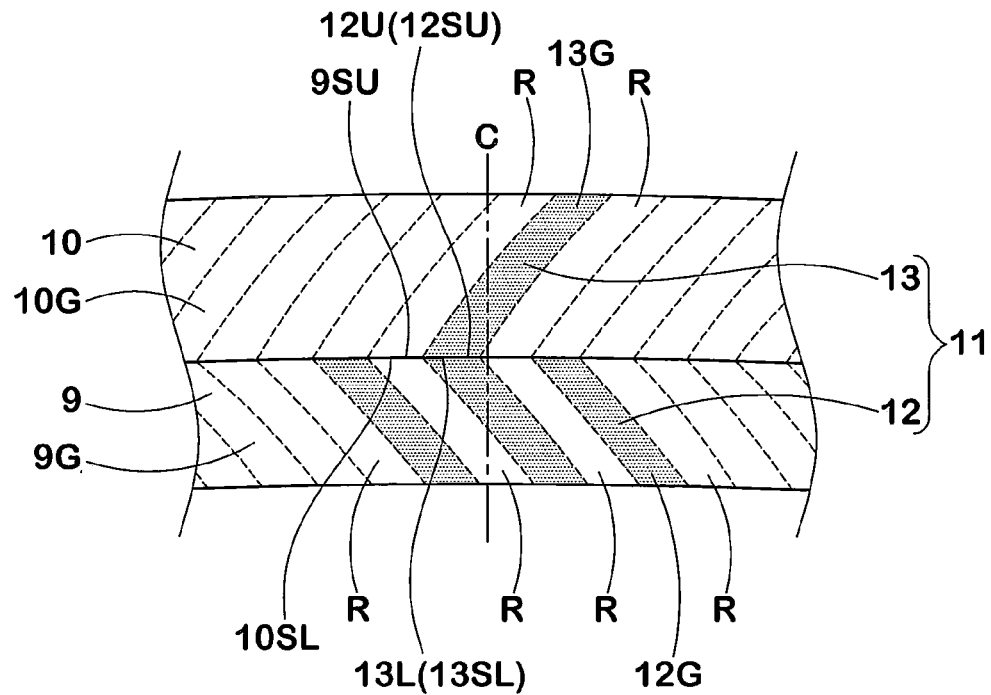
FIG. 3 A more enlarged cross-sectional view of a part of the tread rubber.

The above-mentioned conduction section 11 comprises, as shown in FIG. 3 in closeup, a first electrically conductive winding section 12 formed in the above-mentioned base rubber section 9 and a second electrically conductive winding section 13 formed in the above-mentioned cap rubber section 10.

More particularly, the first electrically conductive winding section 12 is formed of the first electrically conductive rubber strip 12G standing between winding sections R and R of the above-mentioned first electrically non-conductive rubber strip 9G adjacent in the axial direction of the tire inside the above-mentioned base rubber section 9 and is formed of a first electrically conductive rubber strip wound helically with the first electrically non-conductive rubber strip 9G. In this first electrically conductive winding section 12, the winding number of times N of the above-mentioned first electrically conductive rubber strip 12G is not less than one. When the number of times is too large, that brings a negative effect on the rolling resistance. When the number of times is too small, that brings a negative effect on the production efficiency, also in the present invention, since the accuracy of conducting is required between the first electrically conductive winding section 12 and the second electrically conductive winding section 13. Based on this standpoint, the lower limit of the winding number of times N is preferably not less than twice, more preferably not less than three times. The upper limit is preferably not more than ten times, more preferably not more than five times.

Figure 6:
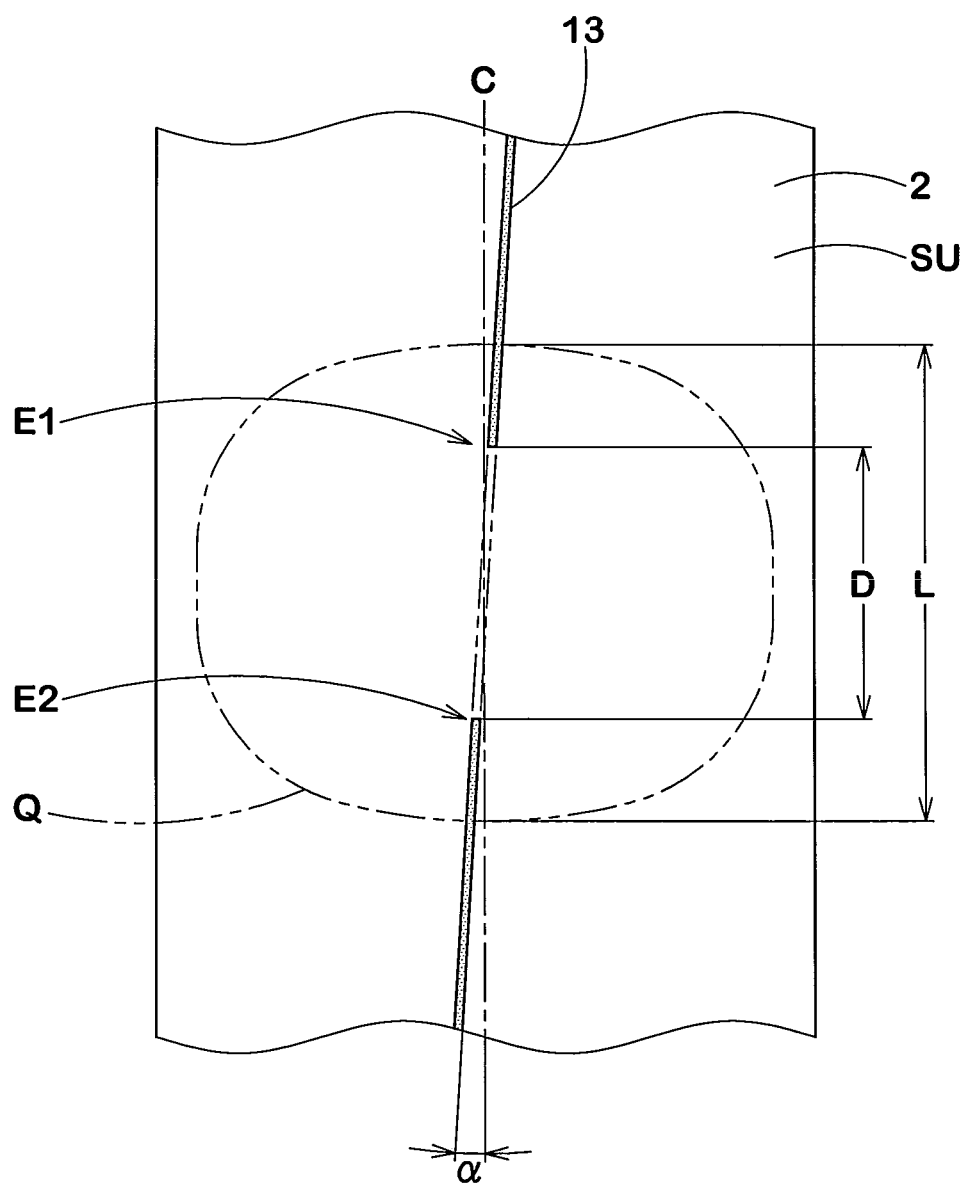
FIG. 6 A development view of the cap rubber section with a second electrically conductive winding section developed on a plane surface.

The above-mentioned second electrically conductive winding section 13 is formed of the second electrically conductive rubber strip 13G standing between winding sections R and R of the above-mentioned second electrically non-conductive rubber strip 10G adjacent in the axial direction of the tire inside the above-mentioned cap rubber section 10 and is formed of a second electrically conductive rubber strip wound helically with the second electrically non-conductive rubber strip 10G. In this second electrically conductive winding section 13, the above-mentioned second electrically conductive rubber strip 13G is wound less than once. As shown in FIG. 6, a circumferential distance D between a starting part E1 and a terminate part E2 of this winding on the tread ground contact area SU is set to not more than 100% of the tread ground contact length L. When the distance D is more than 100%, owing to occur a condition that the second electrically conductive winding section 13 does not contact the road surface while the vehicle is moving, it is at a big disadvantage in electrical discharge. In view of the electrical discharge property, the above-mentioned distance D is preferably not more than 70%, more preferably not more than 50%. The second electrically conductive winding section 13 is wound a minimum times of winding for the electrical discharge; therefore, the wet grip property and the low rolling resistance property can be improved at a maximum.

The width of the first electrically conductive rubber strip 12G is substantially equal to a width wg of the first electrically non-conductive rubber strip 9G. And the width of the second electrically conductive rubber strip 13G is substantially equal to a width wg of the second electrically non-conductive rubber strip 10G.

Figure 5:
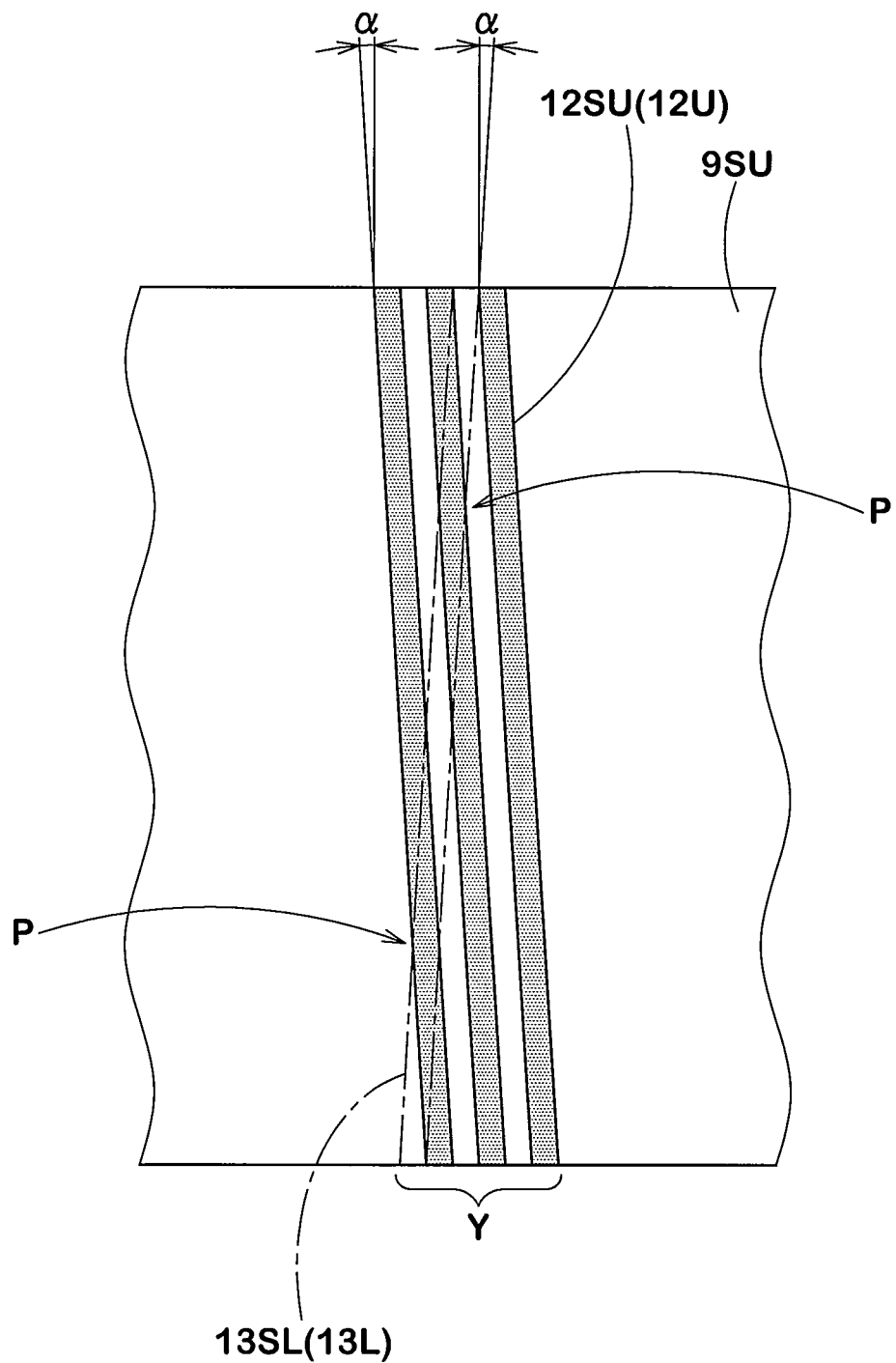
FIG. 5 A development view of the base rubber section with a first electrically conductive winding section developed on a plane surface.

Therefore, the radial upper end 12U of the above-mentioned first electrically conductive winding section 12 is exposed evenly at the radially outer periphery 9SU of the above-mentioned base rubber section 9; and as shown in FIG. 5 conceptually, the radial upper end 12U forms a first exposed surface section 12SU extending with being tilted with respect to in the circumferential direction of the tire on this radially outer periphery 9SU. The radial lower end 13L of the above-mentioned first electrically conductive winding section 13 is exposed evenly at the radially inner periphery 10SL of the above-mentioned cap rubber section 10; and as shown in FIG. 5 with a dotted line, the radial lower end 13L forms a second exposed surface section 13SL extending with being tilted with respect to in the circumferential direction of the tire on the above-mentioned inner circumferential surface 10SL.

The above-mentioned first electrically conductive rubber strip 12G is helically wound with the above-mentioned first electrically non-conductive rubber strip 9G from the one tread edge Te1 side to the other tread edge Te2 side. Therefore, the above-mentioned first exposed surface section 12SU is tilted in downward sloping by a pitch angle α of the above-mentioned helix with respect to the circumferential direction of the tire in FIG. 5. However, the above-mentioned second electrically conductive rubber strip 13G is helically wound with the above-mentioned second electrically non-conductive rubber strip 10G from the other tread edge Te2 side to the one tread edge Te1 side. Therefore, the above-mentioned second exposed surface section 13SL is tilted in upward sloping by a pitch angle α of the above-mentioned helix with respect to the circumferential direction of the tire in FIG. 5.

Consequently, since the tilting angles with respect to the circumferential direction are different between the exposed surface sections 12SU and 13SL, the exposed surface sections 12SU and 13SL can intersect each other, and the above-mentioned first and second electrically conductive winding sections 12 and 13 can be conducted with each other at the point of the intersection. Moreover, the first electrically conductive winding section 12 is wound more than once, and they can intersect at two pints. And in a width region Y of the first electrically conductive winding section 12, even if the forming position of the second electrically conductive winding section 13 is vagrant, the exposed surface section 12SU and the exposed surface section 13SL can certainly intersect with each other.

Incidentally, in this example, for the above-mentioned first and second electrically conductive rubber strips 12G and 13G, the carbon-black-high-containing rubber is used, which contains a high proportion of carbon black s used as a rubber reinforcement agent. Therefore, the electrical conductivity can be kept as same as the above-mentioned topping rubber and the like.

In the above-mentioned tread rubber 2G, to expose the cap rubber section 10 by the end of wear and to conduct an excellent wet grip performance, a ratio Tc/Tba between a radial thickness Tc of the cap rubber section 10 and a radial thickness Tb of the above-mentioned base rubber section 9 on the tire equator C is necessarily more than 1.0, preferably not less than 2.0. However, when the above-mentioned ratio Tc/Tb is too large, the efficacy on differing the helical directions of the electrically conductive rubber strips 12G and 13G becomes less, and the electric resistance of the tire is liable to increase. Therefore, the upper limit of the above-mentioned ratio Tc/Tb is, also in view of making a balance of lamination, preferably not more than 4.0, more preferably not more than 3.0. When the tread groove is provide on the tire equator C, each of the above-mentioned thicknesses Tb and Tc is determined as a thickness measured at a point which is closest to the tire equator C and where no tread groove affects the thickness.

The following is a method of manufacturing the above-mentioned pneumatic tire 1. In this method of manufacturing comprises a tread rubber forming process to form the tread rubber and a vulcanizing process to vulcanize a green tire provided with the above-mentioned tread rubber in the tread section. Processes other than the above-mentioned tread rubber forming process are the same as the conventional processes, and only the tread rubber forming process is hereinafter described.

Figure 7:
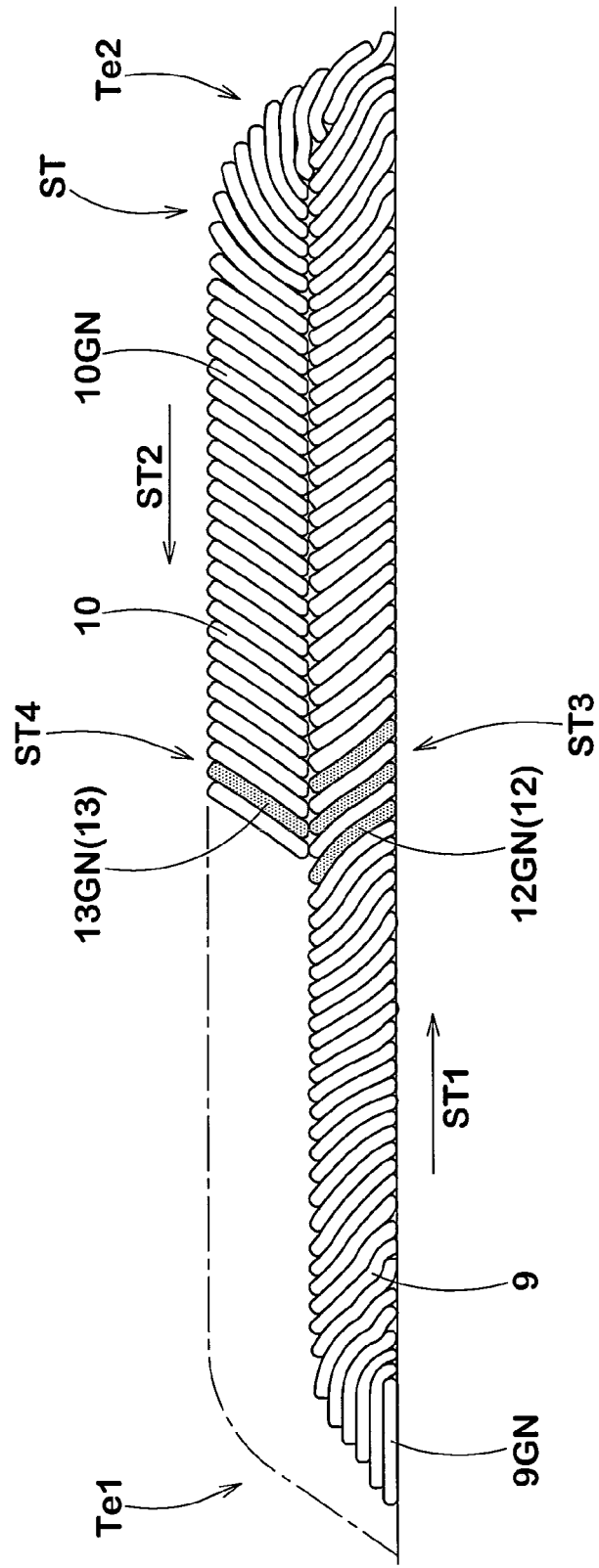
FIG. 7 An explanatory diagram of a tread rubber forming process.

The tread rubber forming process ST comprises a base rubber section forming step ST1 and a cap rubber section forming step ST2 as shown in FIG. 7

The base rubber section forming step ST1 is to form the base rubber section 9 outward the tread reinforcing-cord layer 7 in the radial direction of the tire by helically winding an unvulcanized first electrically non-conductive rubber strip 9GN containing silica from the one tread edge side Te1 to the other tread edge side Te2. The cap rubber section forming step ST2 is to form the cap rubber section 10 outward the above-mentioned base rubber section 9 in the radial direction by helically winding an unvulcanized second electrically non-conductive rubber strip 10GN containing silica from the other tread edge side Te2 to the one tread edge side Te1.

Figure 8:
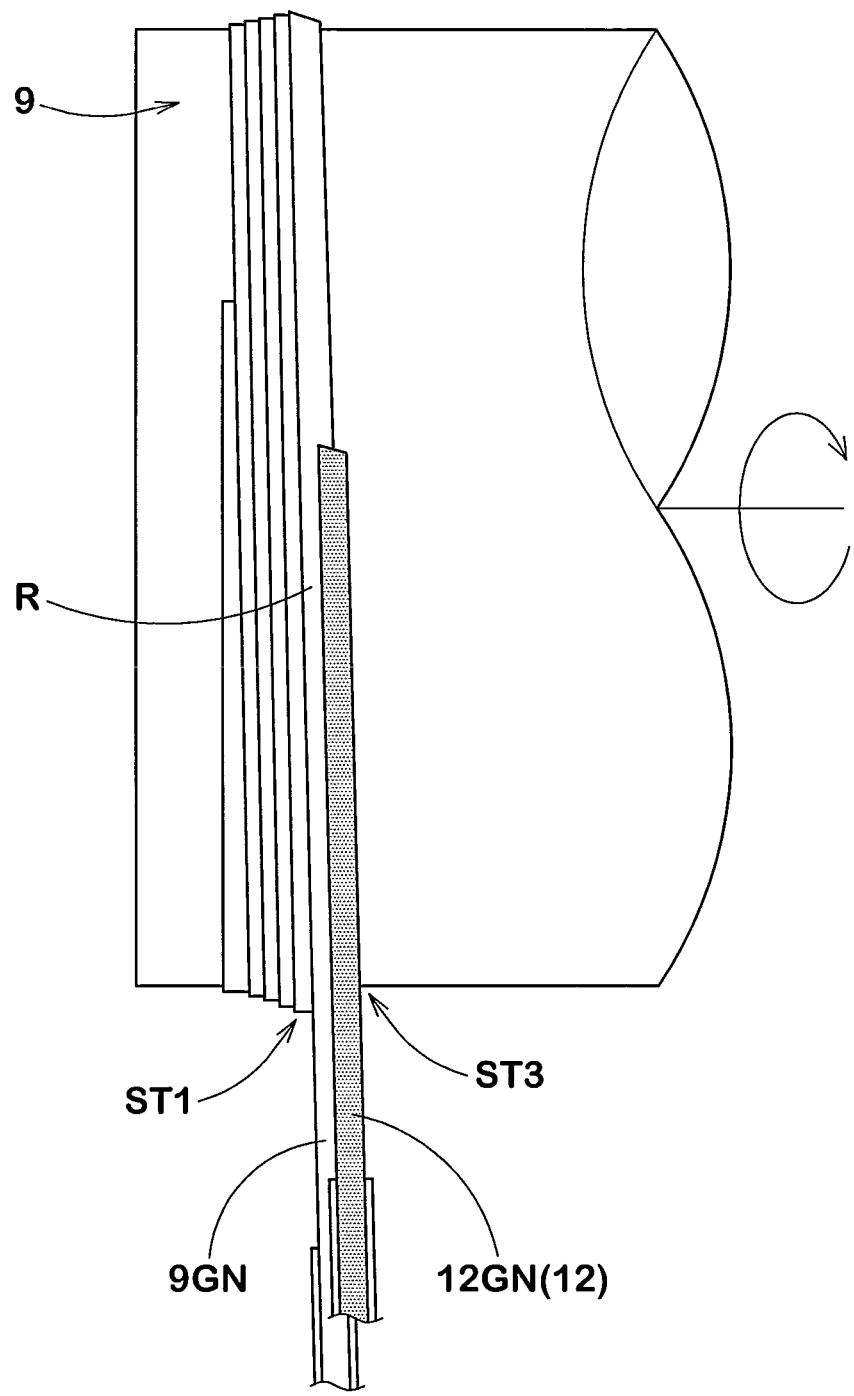
FIG. 8 An explanatory diagram of a base rubber section forming step with a first electrically conductive winding section forming step.

The above-mentioned base rubber section forming step ST1 comprises a step ST3 of forming a first electrically conductive winding section as shown in FIG. 8. The step 3 is to form the first electrically conductive winding section 12 comprising the unvulcanized first electrically conductive rubber strip 12GN wound helically with the unvulcanized first electrically non-conductive rubber strip 9GN between winding sections R and R of the unvulcanized first electrically non-conductive rubber strips 9GN adjacently in the axial direction of the tire by interrupting the unvulcanized first electrically conductive rubber strip 12GN being the substantially same in width as the unvulcanized first electrically non-conductive rubber strip 9GN into the unvulcanized first electrically non-conductive rubber strip 9GN.

Figure 9:
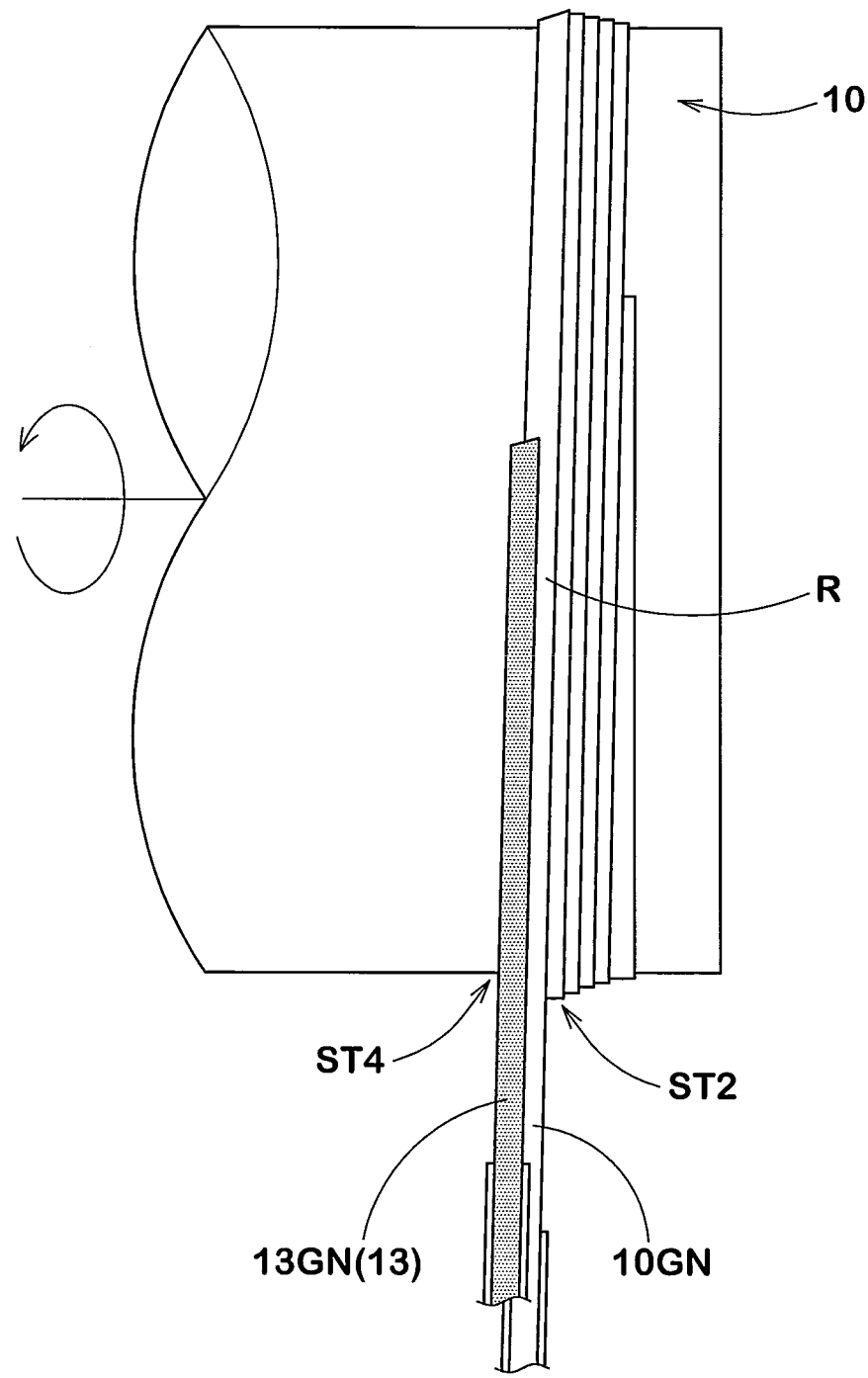
FIG. 9 An explanatory diagram of a cap rubber section forming step with a second electrically conductive winding section forming step.

Similarly, the above-mentioned cap rubber section forming step ST2 comprises a step ST4 of forming a second electrically conductive winding section as shown in FIG. 9. The step 4 is to form the second electrically conductive winding section 13 comprising the unvulcanized second electrically conductive rubber strip 13GN wound helically with the unvulcanized second electrically non-conductive rubber strip 10G between winding sections R and R of the unvulcanized second electrically non-conductive rubber strips 10G adjacently in the axial direction of the tire by interrupting the unvulcanized second electrically conductive rubber strip 13GN being the substantially same in width as the unvulcanized second electrically non-conductive rubber strip 10GN into the unvulcanized second electrically non-conductive rubber strip 10GN.

In this way, the first and second electrically conductive winding sections 12 and 13 can be formed by winding and interrupting the first and second electrically conductive rubber strips 12GN and 13GN when winding the respective unvulcanized first and second electrically non-conductive rubber strips 9GN and 10GN. Therefore, this delivers the superior production efficiency.

Although the especially preferred embodiments of the pneumatic tire and the method of manufacturing it in the present invention have been described in detail, needless to say, the invention is not limited to the above-mentioned shown embodiments, and various modifications can be made.

EXAMPLES

Pneumatic tires (size: 225/50R17) having a regular structure shown in FIG. 1 were made by way of test in accordance with specifications of Table 1. Production efficiency, uniformity, and an incidence of defective product caused by air pocket of each of the tires were measured and compared with one another. In each example, silica-rich electrically non-conductive rubber was used for a cap rubber section and for a base rubber section, and carbon-rich electrically conductive rubber is used for a conduction section, respectively. The compound in each example was the same.

Figure 11A:
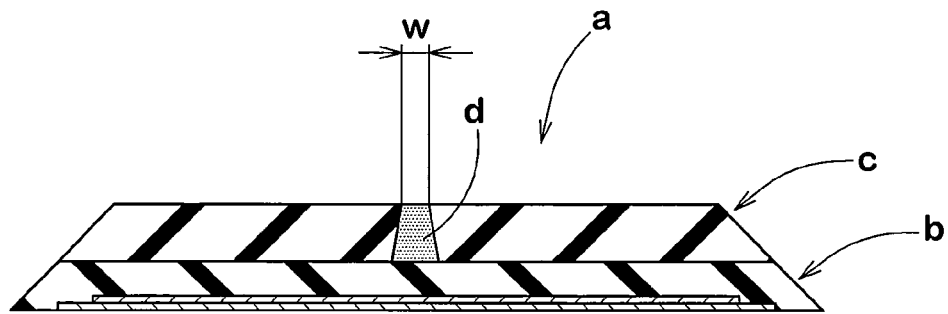
FIGS. 11 (A)-(C) Cross-sectional views explaining the background art.
Figure 11B:
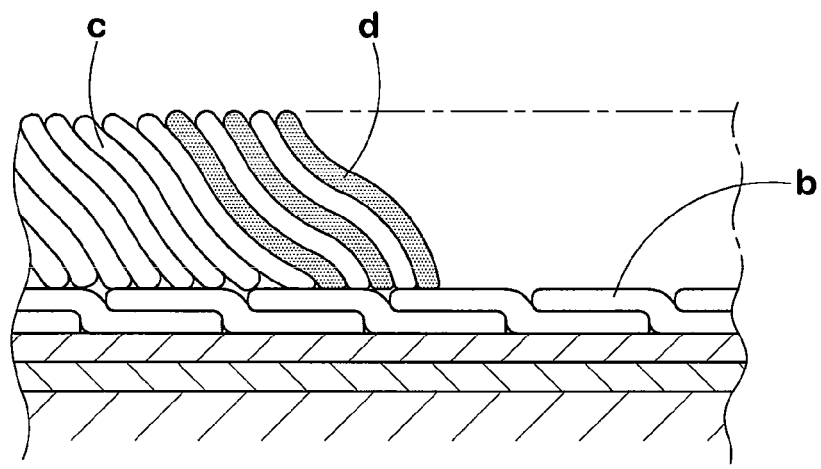
Figure 11C:
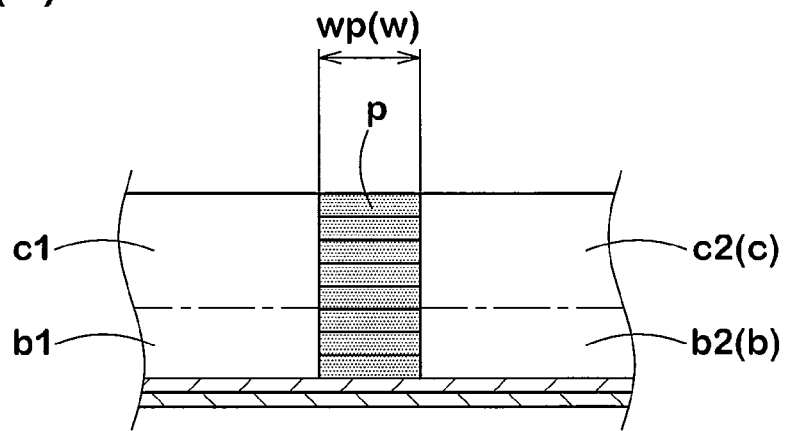

Incidentally, Comparative Example 1A shows a case that a tread rubber was formed in extrusion molding as shown in FIG. 11 (A). However, Comparative Examples 2A and 3A, and Example 1A are cases that the tread rubber was formed in a strip trip winding method (STW method). In Comparative Example 2A and 3A, as shown in FIG. 11 (C), a conduction section was formed by spirally winding the rubber strip in such a way as to stack the rubber strip outwardly in the radial direction. In this case, the base rubber section and the cap rubber section divided by the conduction section into a right half and a left half were formed individually of rubber strip. Test method was as follows.

<Electric Resistance of Tire>

Figure 10:
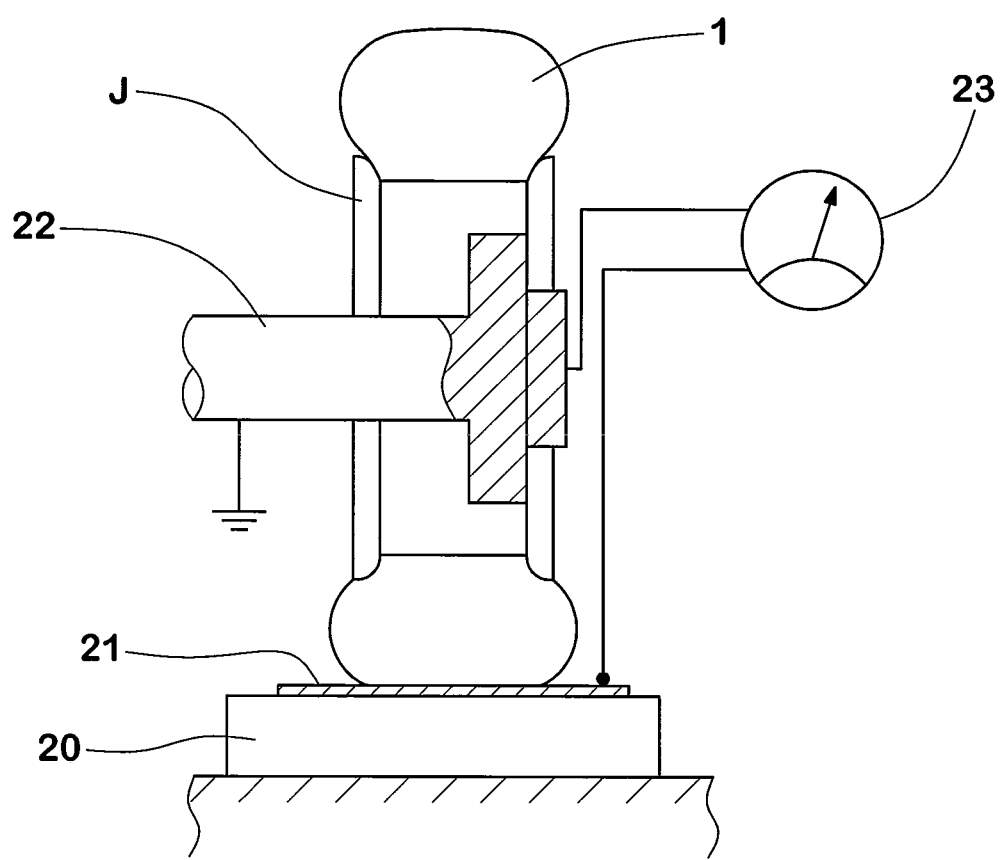
FIG. 10 A schematic cross sectional view of an electric resistance measuring apparatus for the tire showing conceptually.

As shown in FIG. 10, the electric resistance value of an assembly of the test tire and a rim J were measured according to the procedure specified by the Japan Automobile Tire Manufacturers Association (JATMA) by the use of a measuring apparatus. The measuring apparatus comprises a metal plate 21 (Electric resistance value: not more than $10\Omega$) of which surface was polished and which was placed on an insulation plate 20 (Electric resistance value: not less than $10^{12}\Omega$), an electrically conductive tire-mounting shaft 22 to keep the tire/rim assembly, and an electric resistance measuring instrument 23. As to each of the test tires 1, a releasing agent and grimy on a surface were sufficiently removed, and the tire was under a dry condition. Other conditions were as below:

Rim material: Aluminum alloy product
Rim size: 17×7J
Internal pressure: 200 kPa
Load: 5.3 kN
Test environment temperature (Testing laboratory temperature): 25 degrees C.
Humidity: 50%
Measurement range of Electric resistance measuring instrument: from $10^3$ to $1.6\times10^{16}\Omega$
Test voltage (Applied voltage): 1000 V.

The test procedures were as follows:
(1) To mount the test tire 1 on a rim so as to prepare a tire/rim assembly. At this time, soapy water was used as a lubricant agent for a contact region between them.
(2) To mount the tire/rim assembly on a tire-mounting shaft 22 after remaining untouched in a testing laboratory for two hours.
(3) To apply the above-mentioned load into the tire/rim assembly for 0.5 minutes. After unloading moreover, to apply the load for 0.5 minutes; and after unloading, to apply the load for two minutes.
(4) After a lapse of 5 minutes in applying the test voltage to the tire, to measure values of electric resistance between the tire-mounting shaft 22 and the metal plate 21 by the use of the apparatus of electric resistance measurement 23. The above-mentioned measurement was conducted at 4 points at 90 degrees intervals in the circumferential direction of the tire. The maximal value among them was defined as an electric resistance value (a measured value) of the tire T.

<Uniformity of Tire>

In accordance with a uniformity test condition of JASO C607:2000, a radial force variation (RFV) was measured under the following condition in each of the test tires. Evaluation was defined as the reciprocal of each RFV and displayed using indices with Comparative Example 1A being 100 in Table 1, and with Comparative Example 1B being 100 in Table 2. The larger the numeric value was, the more favorable it was.

Rim: 17×7J
Internal pressure: 200 kPa
Load: 4.08 kN
Rotation Speed: 60 rpm.

The test results are shown in Table 1.

<Productivity>

The production efficiency when producing the respective tires was evaluated using indices with Comparative Example 2A being 100. The larger the numeric value of the production efficiency was, the more favorable it was.

<Incidence of Defective Product Caused by Air Pocket>

On thousand tires per each test tire were produced; and at this time, an incidence of defective products caused by an air pocket was compared.

TABLE 1

|  | Com. Ex. 1A | Com. Ex. 2A | Com. Ex. 3A | Ex. 1A |
|---|---|---|---|---|
| Method of manufacturing Tread Rubber | Extrusion molding FIG. 11 (A) | STW FIG. 11 (C) | STW FIG. 11 (C) | STW FIG. 2 |
| Width W of Conduction section | 2 mm | 2 mm | 5 mm | 2 mm |
| Productivity | — | 100 | 110 | 120 |
| Uniformity of Tire | 100 | — | 102 | 105 |
| Defective product caused by Air pocket | 0% | *1 | 5% | 0% |
| Electrical resistance (×$10^8$ Ω) | 0.1 | — | 0.1 | 0.1 |

*1 Unable to form a tire due to a loss of shape in the winding of a conduction section.

As will be noted from the Table, it is confirmed that the incidence of air pocket is suppressed in the tires of Example; therefore, the incidence of defective product can be reduced, and the uniformity can be improved, and the production efficiency can also be improved.

Similarly, test tires having a structure in a strip winding method (STW Method) were made in accordance with specifications of Table 2. And, the electric resistance, rolling resistance, uniformity, and grip performance of each of the tires were measured and compared with one another. Test procedures were as follows.

<Rolling Resistance>

The rolling resistance was measured by the use of a rolling resistance testing apparatus under the following conditions. Evaluation was displayed using indices with Comparative Example 1B being 100. The larger the numeric value was, the smaller the rolling resistance was; and the more favorable it was.

Rim: 17×7J
Internal pressure: 200 kPa
Load: 4.7 kN
Speed: 80 km/h.

<Grip Performance>

Each of the test tires was mounted on the rim (17×7J) under the internal pressure (200 kPa) for all wheels of a vehicle (3500 cc). The grip performance (grip limit) when the vehicle ran on an asphalted road surface of a tire test course in wet condition was evaluated. The evaluation was performed in a driver's feeling test and displayed on a scale of one to ten with Comparative Example 1B as a six. The larger the numeric value of the grip performance was, the more favorable it was.

Incidentally, the test method for the electric resistance and the uniformity of the tire are the same as a case of the Table 1.

TABLE 2

|  | Com. Ex. 1B | Ex. 1B | Ex. 2B | Ex. B3 | Ex. B4 | Ex. B5 |
|---|---|---|---|---|---|---|
| Method of manufacturing Tread Rubber | STW Fig. 2 | STW Fig. 2 | STW Fig. 2 | STW Fig. 2 | STW Fig. 2 | STW Fig. 2 |
| Width W of Conduction section | 2 mm | 2 mm | 2 mm | 2 mm | 2 mm | 2 mm |
| Cap rubber section Winding direction | Te1 → Te2 | Te2 → Te1 | Te2 → Te1 | Te2 → Te1 | Te2 → Te1 | Te2 → Te1 |
| Thickness Tc <mm> | 8.0 | 8.0 | 7.0 | 8.0 | 7.0 | 6.0 |
| tan δ2 | 0.20 | 0.20 | 0.20 | 0.25 | 0.25 | 0.20 |
| Base rubber section Winding direction | Te1 → Te2 | Te1 → Te2 | Te1 → Te2 | Te1 → Te2 | Te1 → Te2 | Te1 → Te2 |
| Thickness Tb <mm> | 2.0 | 2.0 | 3.0 | 2.0 | 3.0 | 4.0 |
| tan δ1 | 0.10 | 0.10 | 0.10 | 0.10 | 0.10 | 0.10 |
| Ratio Tc/Tb | 4 | 4 | 2.3 | 4 | 2.3 | 1.5 |
| Ratio tan δ2/ tan δ1 | 2 | 2 | 2 | 2.5 | 2.5 | 2 |
| Rolling resistance | 100 | 100 | 105 | 95 | 97 | 109 |
| Uniformity of tire | 100 | 105 | 107 | 105 | 107 | 106 |
| Electrical resistance (×10$^8$ Ω) | 0.80 | 0.50 | 0.10 | 0.50 | 0.08 | 0.09 |
| Grip performance | 6.0 | 6.1 | 5.8 | 7.0 | 6.7 | 5.5 |

As will be noted from Table 2, it is confirmed that the first and second electrically conductive winding sections can be reliably conducted owing to the difference of the helical winding directions between the first and second electrically conductive rubber strips, and that the electric resistance of the tire can be reduced.

The invention claimed is:

1. A pneumatic tire comprising a toroidal carcass extending from a tread section to a bead core in a bead section through a sidewall section, a tread reinforcing-cord layer disposed outside the carcass in the radial direction of the tire and inside the above-mentioned tread section and electrically-conducted to a rim at a state of mounting the tire on the rim, and a tread rubber of which a radially inner periphery forms a contact area contacting the above-mentioned tread reinforcing-cord layer and of which a radially outer periphery forms a tread ground contact area contacting a road surface; characterized in that the above-mentioned tread rubber comprises a base rubber section which is formed of a strip winding body made of a first electrically non-conductive rubber strip containing silica and helically wound from one tread edge side to another tread edge side and which comprises the above-mentioned contact area, a cap rubber section which is formed of a strip winding body made of a second electrically non-conductive rubber strip containing silica and helically wound from the other tread edge side to the one tread edge side and which comprises the above-mentioned tread ground contact area and is superposed on the above-mentioned base rubber section outwardly in the radial direction, and a conduction section which penetrates through the above-mentioned base rubber section and the above-mentioned cap rubber section and extends inward and outward in the radial direction and of which radial inner end is exposed at the above-mentioned contact area and of which radial outer end is exposed at the above-mentioned tread ground contact area;

wherein the above-mentioned conduction section comprises a first electrically conductive winding section standing between winding sections of the above-mentioned first electrically non-conductive rubber strip adjacent in the tire axial direction inside the above-mentioned base rubber section and formed of a first electrically conductive rubber strip wound helically more than once with the above-mentioned first electrically non-conductive rubber strip, and a second electrically conductive winding section standing between winding sections of the above-mentioned second electrically non-conductive rubber strip adjacent in the tire axial direction inside the above-mentioned cap rubber section and formed of a second electrically conductive rubber strip wound helically with the above-mentioned second electrically non-conductive rubber strip;

an exposed surface section comprising a radial upper end of the above-mentioned first electrically conductive winding section exposed at the radially outer periphery of the above-mentioned base rubber section and an exposed surface section comprising a radial lower end of the above-mentioned second electrically conductive winding section exposed at the radially inner periphery of the above-mentioned cap rubber section are tilted in different directions relative to the circumferential direction of the tire, and these exposed surface sections intersect each other, and as the result, the above-mentioned first and second electrically conductive winding sections are conducted each other at the above-mentioned position of the intersection; and in the above-mentioned second electrically conductive winding section, the above-mentioned second electrically conductive rubber strip is helically wound less than once, and a circumferential distance D in the tread ground contact area between the starting part and the terminate part of this winding is not more than 100% of a tread ground contacting length L.

2. The pneumatic tire as set forth in claim 1, characterized a ratio Tc/Tb on the tire equator in that the tread rubber between a radial thickness Tc of the cap rubber section and a radial thickness Tb of the above-mentioned base rubber section is more than 1.0.

3. The pneumatic tire as set forth in claim 1, characterized in that a loss tangent tan δ2 of the above-mentioned second electrically non-conductive rubber strip is larger than a loss tangent tan δ1 of the above-mentioned first electrically non-conductive rubber strip.

4. A method of manufacturing a pneumatic tire comprising a tread reinforcing-cord layer electrically-conductive to a rim in a state of the tire mounted on the rim, a tread rubber of which the radially inner periphery forms a contact area contacting the above-mentioned tread reinforcing-cord layer and of which the radially outer periphery forms a tread ground contact area contacting a road surface; characterized in that the method comprises a tread rubber forming process and a vulcanizing process to vulcanize a green tire provided with the above-mentioned tread rubber in the tread section;

wherein the above-mentioned process of forming the tread rubber comprises a base rubber section forming step to form the base rubber section outward the above-mentioned tread reinforcing-cord layer in the radial direction of the tire by helically winding an unvulcanized first electrically non-conductive rubber strip containing silica from the one tread edge side to the other tread edge side, and a cap rubber section forming step to form the cap rubber section outward the above-mentioned base rubber portion in the radial direction by helically winding an unvulcanized second electrically non-conductive rubber strip containing silica from the other tread edge side to the one tread edge side;

the above-mentioned step of forming the base rubber section comprises a step of forming a first electrically conductive winding section to form the first electrically conductive winding section comprising the unvulcanized first electrically conductive rubber strip wound helically more than once with the unvulcanized first electrically non-conductive rubber strip between winding sections of the above-mentioned unvulcanized first electrically non-conductive rubber strips adjacently in the axial direction of the tire by interrupting the unvulcanized first electrically conductive rubber strip being the substantially same in width as the above-mentioned unvulcanized first electrically non-conductive rubber strip into the above-mentioned unvulcanized first electrically non-conductive rubber strip; and the above-mentioned cap rubber section forming step comprises a step of forming a second electrically conductive winding section to form the second electrically conductive winding section comprising the unvulcanized second electrically conductive rubber strip wound helically with the unvulcanized second electrically non-conductive rubber strip between winding sections of the above-mentioned unvulcanized second electrically non-conductive rubber strips adjacently in the axial direction of the tire by interrupting into the above-mentioned unvulcanized second electrically non-conductive rubber strip the unvulcanized second electrically conductive rubber strip being the substantially same in width as the above-mentioned unvulcanized second electrically non-conductive rubber strip;

wherein an exposed surface section comprising a radial upper end of the above-mentioned first electrically conductive winding section exposed at the radially outer periphery of the above-mentioned base rubber section and an exposed surface section comprising a radial lower end of the above-mentioned second electrically conductive winding section exposed at the radially inner periphery of the above-mentioned cap rubber section are tilted in different directions relative to the circumferential direction of the tire, and these exposed surface sections intersect each other, and as a result, the above-mentioned first and second electrically conductive winding sections are conducted each other at the above-mentioned position of the intersection; and wherein, in the above-mentioned second electrically conductive winding section, the above-mentioned second electrically conductive rubber strip is helically wound less than once.

\* \* \* \* \*